United States Patent
Lin

(10) Patent No.: US 8,544,155 B2
(45) Date of Patent: Oct. 1, 2013

(54) SAFETY HOOK

(71) Applicant: Usang Industrial Co., Ltd., Taipei (TW)

(72) Inventor: Yu-Wen Lin, Taipei (TW)

(73) Assignee: Usang Industrial Co., Ltd., Taipei (TW)

( * ) Notice: Subject to any disclaimer, the term of this patent is extended or adjusted under 35 U.S.C. 154(b) by 0 days.

(21) Appl. No.: 13/720,255

(22) Filed: Dec. 19, 2012

(65) Prior Publication Data

US 2013/0160252 A1 Jun. 27, 2013

(30) Foreign Application Priority Data

Dec. 21, 2011 (TW) .............................. 100224146 U

(51) Int. Cl.
*F16B 45/02* (2006.01)

(52) U.S. Cl.
USPC .................... 24/600.1; 24/599.7; 24/601.1

(58) Field of Classification Search
USPC ............ 24/600.1, 599.4, 599.5, 599.6, 599.7, 24/599.8, 599.9, 601.1; 294/82.2
See application file for complete search history.

(56) References Cited

U.S. PATENT DOCUMENTS

| | | | | |
|---|---|---|---|---|
| 659,686 A * | 10/1900 | Mitchell | ....................... | 24/599.4 |
| 731,162 A * | 6/1903 | Carter | ........................... | 24/600.1 |
| 1,626,865 A * | 5/1927 | Neilson | ........................ | 294/82.2 |
| 1,879,168 A * | 9/1932 | Freysinger | ................... | 24/600.1 |
| 2,197,997 A * | 4/1940 | Dee | ............... | 294/82.2 |
| 4,621,851 A * | 11/1986 | Bailey, Jr. | .................... | 294/82.2 |
| 5,257,441 A * | 11/1993 | Barlow | ........................ | 24/599.5 |
| 5,735,025 A * | 4/1998 | Bailey | ........................... | 24/600.1 |
| 6,898,829 B2 * | 5/2005 | Loe et al. | ..................... | 24/599.5 |
| 7,444,723 B2 * | 11/2008 | Lin | .............................. | 24/600.1 |

* cited by examiner

*Primary Examiner* — Robert J Sandy
*Assistant Examiner* — Abigail E Morrell
(74) *Attorney, Agent, or Firm* — Foley & Lardner LLP

(57) ABSTRACT

A safety hook includes a main body defining an inner space and an opening, a latch unit pivoted to the main body, an operable unit pivoted to the main body, and a safety lock unit. The latch unit is normally at a closed position for blocking the opening. When the operable unit is pressed, the safety lock unit is co-rotatable with the operable unit with respect to the main body from a locked position, where the safety lock unit abuts against the latch unit to retain the latch unit at the closed position, to an unlocked position, where the safety lock unit is removed from the latch unit to allow the latch unit to rotate from the closed position to an opened position allowing access into the inner space through the opening.

14 Claims, 6 Drawing Sheets

SAFETY HOOK

CROSS-REFERENCE TO RELATED APPLICATION

This application claims priority of Taiwanese Patent Application No. 100224146, filed on Dec. 21, 2011.

BACKGROUND OF THE INVENTION

1. Field of the Invention

This invention relates to a safety hook, more particularly to a safety hook provided with a safety lock unit.

2. Description of the Related Art

Referring to FIG. 1, U.S. Pat. No. 7,444,723 discloses a conventional safety hook 9 including: a hook body 91 defining a hook inner space 10 therein and a hook mouth 100 in spatial communication with the hook inner space 10; a latch unit 92 pivoted to the hook body 91 about a first axis (A) so as to be rotatable relative to the hook body 91 between locked and unlocked positions; a releasing unit 93 pivoted to the hook body 91 about a second axis (B) so as to be rotatable relative to the hook body 91; and a safety lock unit 94 disposed between the latch unit 92 and the releasing unit 93 and pivoted to the hook body 91 about a third axis (C) so as to be rotatable relative to the hook body 91 between restraining and releasing positions. The latch unit 92 blocks the hook mouth 100 when the latch unit 92 is disposed at the locked position, thereby denying access into the hook inner space 10 via the hook mouth 100.

The safety lock unit 94 has a pivoting middle portion 941 pivoted to the hook body 91, a restraining end portion 942 extending from one end of the pivoting middle portion 941 to abut against the latch unit 92, and a driven end portion 943 extending from the other end of the pivoting middle portion 941 to abut against the releasing unit 93 so as to permit the safety lock unit 94 to be driven by the releasing unit 93 to rotate from the restraining position to the releasing position. The restraining end portion 942 and the driven end portion 943 of the safety lock unit 94 form an angle of less than 180 degrees and greater than 90 degrees. The restraining end portion 942 of the safety lock unit 94 is perpendicular to the latch unit 92 when the safety lock unit 94 is disposed at the restraining position, thereby preventing rotation of the latch unit 92 from the locked position to the unlocked position. The restraining end portion 942 of the safety lock unit 94 is inclined to the latch unit 92 at an angle of less than 90 degrees when the safety lock unit 94 is disposed at the releasing position, thereby permitting rotation of the latch unit 92 from the locked position to the unlocked position.

SUMMARY OF THE INVENTION

An object of the present invention is to provide a safety hook provided with a safety lock unit.

Accordingly, a safety hook of the present invention comprises a main body, a first pivot member, a latch unit, a second pivot member, an operable unit, and a safety lock unit.

The main body includes a base portion, an intermediate portion that is connected to the base portion, and a hook portion that is connected to the intermediate portion opposite to the base portion, that curvedly extends from the intermediate portion toward the base portion, and that cooperates with the base portion to define an opening therebetween. The first pivot member is disposed at the base portion of the main body, and the second pivot member is disposed at the intermediate portion of the main body. The latch unit is pivoted to the base portion of the main body by the first pivot member, is normally at a closed position where the latch unit blocks the opening, is rotatable with respect to the base portion from the closed position to an opened position where the latch unit allows access through the opening, and has an inner surface facing the intermediate portion. The operable unit is pivoted to the intermediate portion of the main body by the second pivot member, and includes a user-operable portion distant from the second pivot member. The safety lock unit is pivoted to the intermediate portion by the second pivot member, and includes an abutting end portion capable of abutting against the inner surface of the latch unit.

When the user-operable portion of the operable unit is pressed, the safety lock unit is co-rotatable with the operable unit with respect to the intermediate portion of the main body from a locked position, where the abutting end portion of the safety lock unit abuts against the inner surface of the latch unit so as to retain the latch unit at the closed position, to an unlocked position, where the abutting end portion of the safety lock unit is removed from the inner surface of the latch unit so as to allow the latch unit to pivot with respect to the base portion of the main body from the closed position to the opened position.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
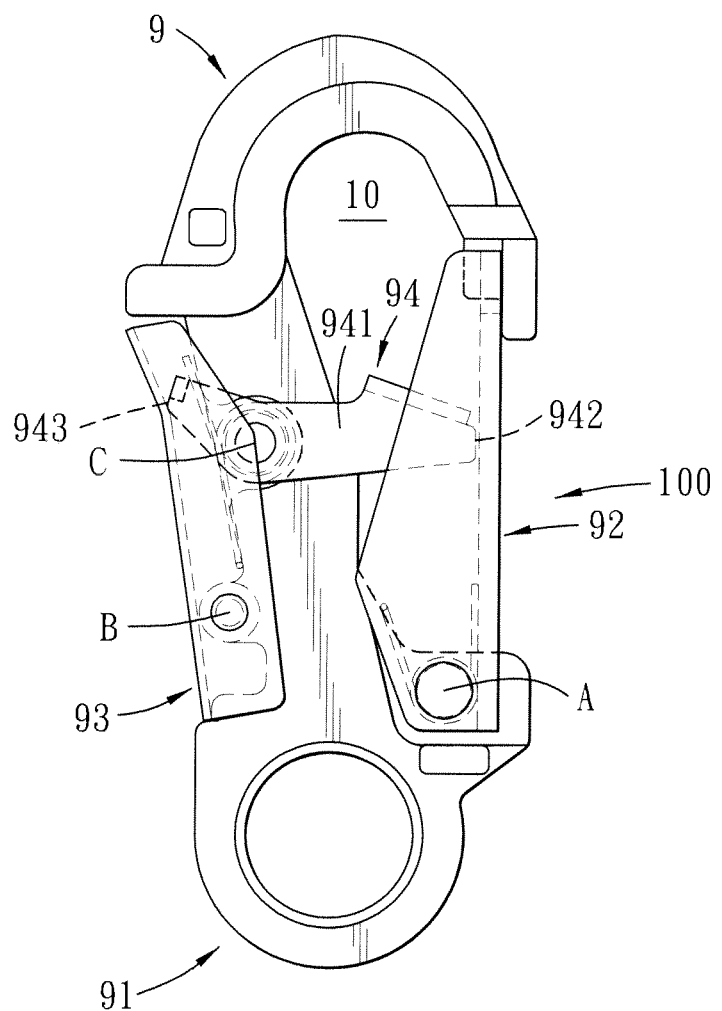
FIG. 1 is a schematic view of a conventional safety hook disclosed in U.S. Pat. No. 7,444,723.
Figure 2:
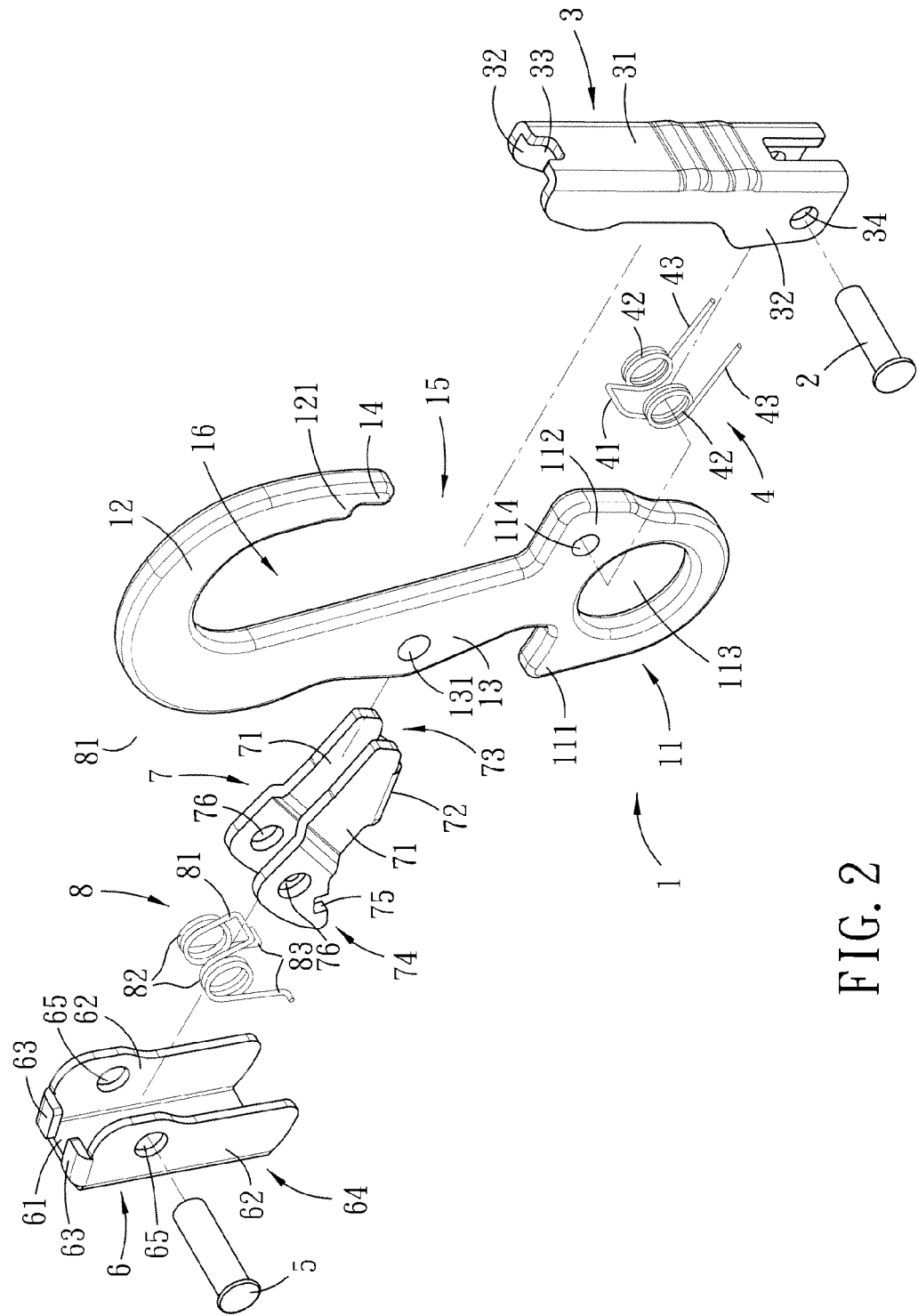
FIG. 2 is an exploded perspective view of a preferred embodiment of a safety hook according to this invention.
Figure 3:
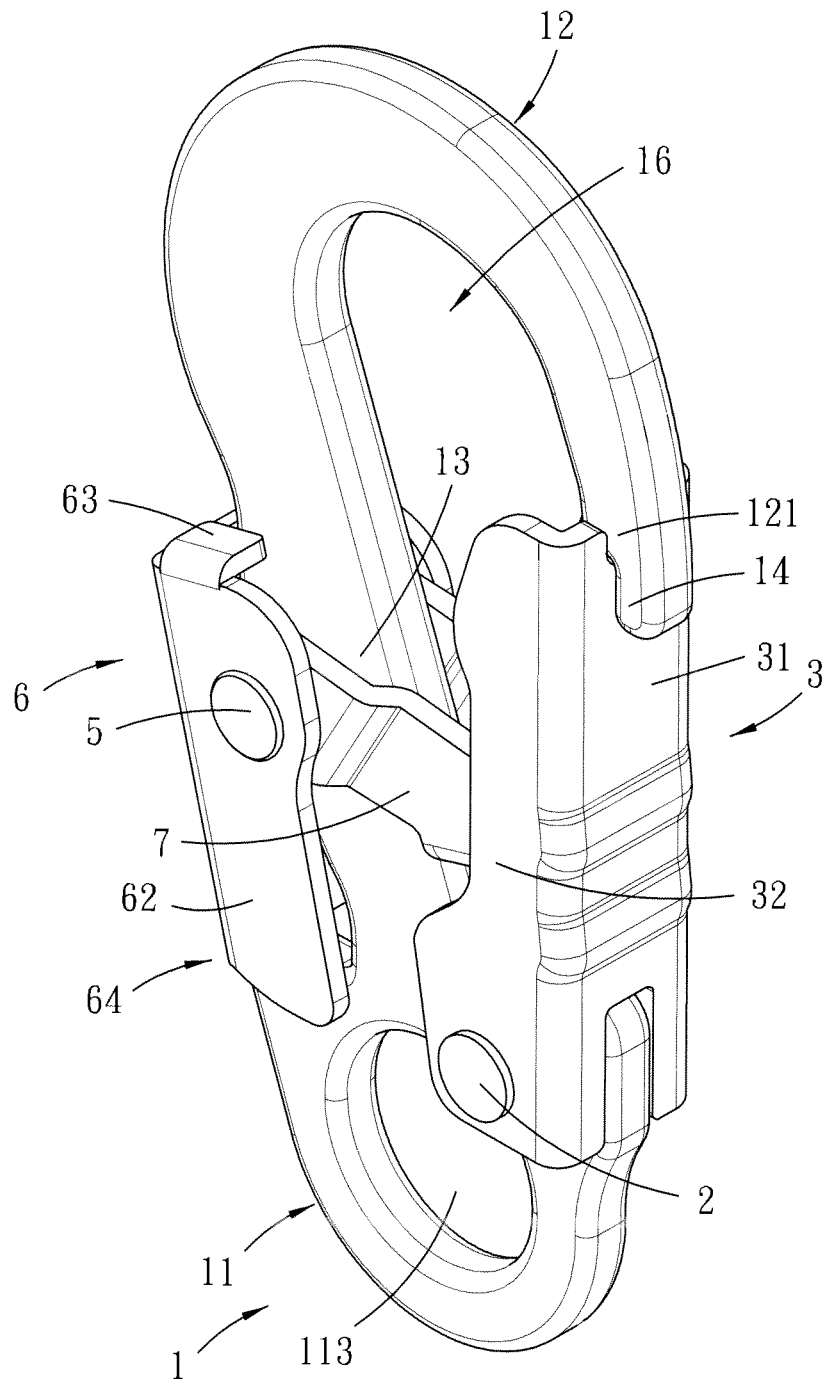
FIG. 3 is a perspective view of the safety hook of the preferred embodiment.
Figure 4:
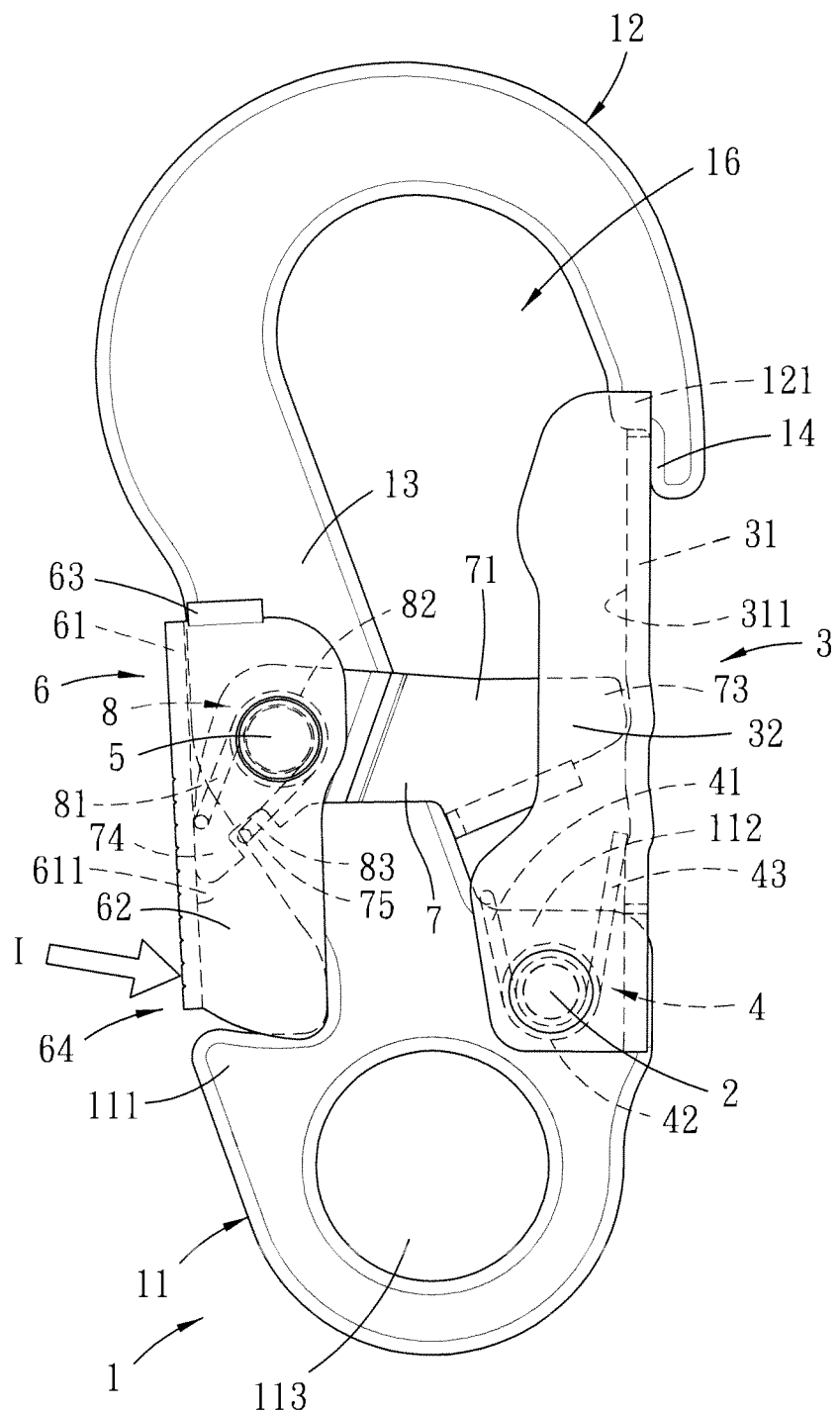
FIGS. 4 to 6 are side views illustrating operation of the safety hook of the preferred embodiment.

As shown in FIGS. 2 to 4, a preferred embodiment of a safety hook of this invention includes a main body 1, a first pivot member 2, a latch unit 3, a first elastic member 4, a second pivot member 5, an operable unit 6, a safety lock unit 7, and a second elastic member 8. In this embodiment, each of the first and second pivot members 2, 5 is a shaft, and each of the first and second elastic members 4, 8 is a torsion spring.

The main body 1 includes a base portion 11, an intermediate portion 13 connected to the base portion 11, a hook portion 12 connected to the intermediate portion 13 and including a free end 121 that is opposite to the intermediate portion 13 and that faces the base portion 11, and a protrusion 14 protruding from the free end 121 toward the base portion 11. The base portion 11 includes a first side 111 and a second side 112 opposite to the first side 111, and is formed with a central hole 113 in a middle part of the base portion 11 between the first and second sides 111, 112 for extension of a cord or the like (not shown) therethrough. The base portion 11 is further formed with a first pivot hole 114 in the second side 112. The base portion 11, the intermediate portion 13, the hook portion 12 and the protrusion 14 cooperatively define an inner space 16. The hook portion 12 is opposite to the base portion 11, curvedly extends from the intermediate portion 13 toward the second side 112 of the base portion 11, and cooperates with the base portion 11 to define an opening 15 in spatial communication with the inner space 16.

The latch unit 3 includes a plate portion 31 and two parallel side portions 32 extending respectively from lateral sides of the plate portion 31 toward the intermediate portion 13 of the main body 1. Specifically, the plate portion 31 and the two parallel side portions 32 are arranged to form a U shape. Each of the side portions 32 is formed with a first through hole 34. In this embodiment, for assembling the latch unit 3 to the main body 1, the base portion 11 of the main body 1 is placed between the parallel side portions 32, and then, the first pivot member 2 (e.g., a shaft) extends through the first through hole 34 in one of the side portions 32, the first pivot hole 114, and the first through hole 34 in another one of the side portions 32 in sequence, so that the latch unit 3 is pivoted to the base portion 11 by the first pivot member 2.

Figure 6:
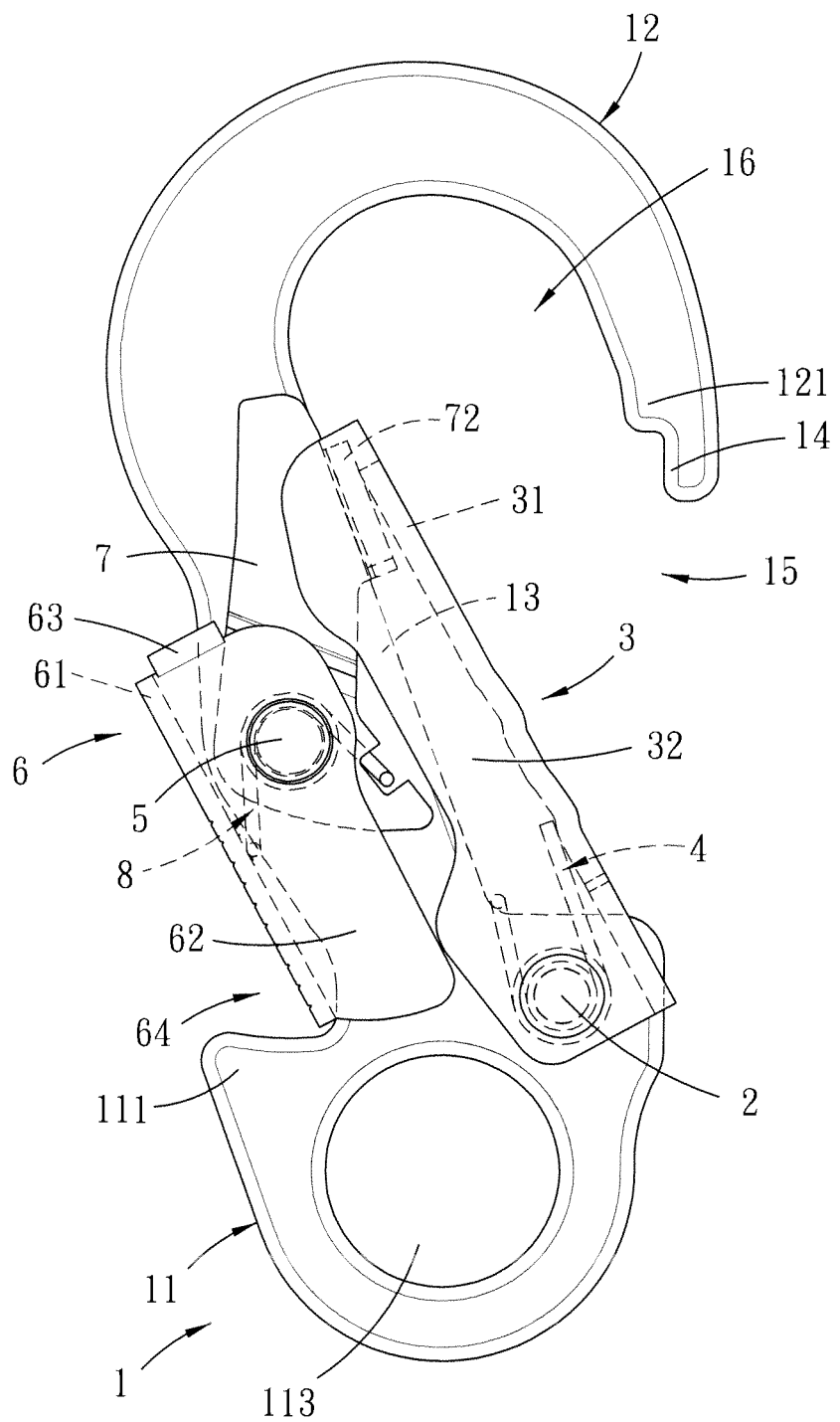

As shown in FIG. 3, the latch unit 3 is normally at a closed position where the latch unit 3 blocks the opening 15 between the base portion 11 and the hook portion 12. The latch unit 3 is rotatable with respect to the base portion 11 from the closed position to an opened position where the latch unit 3 allows access into the inner space 16 through the opening 15 (as shown in FIG. 6). The latch unit 3 has an inner surface 311 facing the intermediate portion 13, and the plate portion 31 of the latch unit 3 has an edge formed with a notch 33. When the latch unit 3 is at the closed position, the notch 33 receives the free end 121 of the hook portion 12 and the protrusion 14 abuts against the plate portion 31.

The first elastic member 4 includes a first intermediate segment 41 disposed astride the base portion 11 of the main body 1 at the second side 112, two first winding segments 42 respectively and spirally extending from two opposite ends of the first intermediate segment 41 in a ring shape and winding around the first pivot member 2, and two first biasing arms 43 extending respectively from the first winding segments 42 and abutting against and biasing the inner surface 311 of the latch unit 3. As a result, the first elastic member 4 provides a force to retain the latch unit 3 at the closed position and to restore the latch unit 3 from the opened position to the closed position.

The operable unit 6 includes a middle wall 61, and two parallel side walls 62 extending from lateral sides of the middle wall 61 toward the latch unit 3. The side walls 62 and the middle wall 61 are arranged to form a U shape. Each of the side walls 62 is formed with a second through hole 65. The intermediate portion 13 of the main body 1 is formed with a second pivot hole 131. The second pivot member 5 (e.g., a shaft) extends through the second through holes 65 in the side walls 62 and the second pivot hole 131 so that the operable unit 6 is pivoted to the intermediate portion 13 of the main body 1 by the second pivot member 5. The operable unit 6 further includes a user-operable portion 64 that is distant from the second pivot member 5, that is spaced apart from the intermediate portion 13 of the main body 1, and that is adjacent to the first side 111 of the base portion 11 of the main body 1. The side walls 62 of the operable unit 6 have respective edges opposite to the user-operable portion 64, and the operable unit further includes two protruding portions 63 protruding respectively from the edges of the side walls 62 toward each other. In particular, the protruding portions 63 are configured to receive the intermediate portion 13 of the main body 1, so that the operable unit 6 is stably mounted to the intermediate portion 13 of the main body 1.

The safety lock unit 7 includes two wing plates 71 spaced apart from and parallel to each other, and a connecting portion 72 interconnecting the wing plates 71. Each of the wing plates 71 is formed with a third through hole 76, and includes a positioning portion 75 adjacent to the operable unit 6. In this embodiment, each of the wing plates 71 is further formed with a notch serving as the positioning portion 75. More specifically, the second pivot member 5 extends through the second through holes 65, the third through holes 76 in the wing plates 71, and the second pivot hole 131 so as to pivot both the operable unit 6 and the safety lock unit 7 to the intermediate portion 13 of the main body 1. The safety lock unit 7 further includes a first abutting end portion 73, and a second abutting end portion opposite to the first abutting end portion 73. The first abutting end portion 73 abuts against the inner surface of the latch unit 3 when the latch unit 3 is at the closed position. The second abutting end portion 74 is able to abut against an inner surface 611 of the operable unit 6, so that the safety lock unit 7 may co-rotate with the operable unit 6 with respect to the intermediate portion 13 about the second pivot member 5.

The second elastic member 8 includes a second intermediate segment 81 disposed astride the intermediate portion 13 of the main body 1, two second winding segments 82 respectively and spirally extending from two opposite ends of the second intermediate segment 81 in a ring shape and winding around the second pivot member 5, and two second biasing arms 83 extending respectively from the second winding segments 82 and abutting against and biasing the safety lock unit 7. The positioning portions 75 of the wing plates 71 of the safety lock unit 7 receive and position the second biasing arms 83 of the second elastic member 8, respectively.

Figure 5:
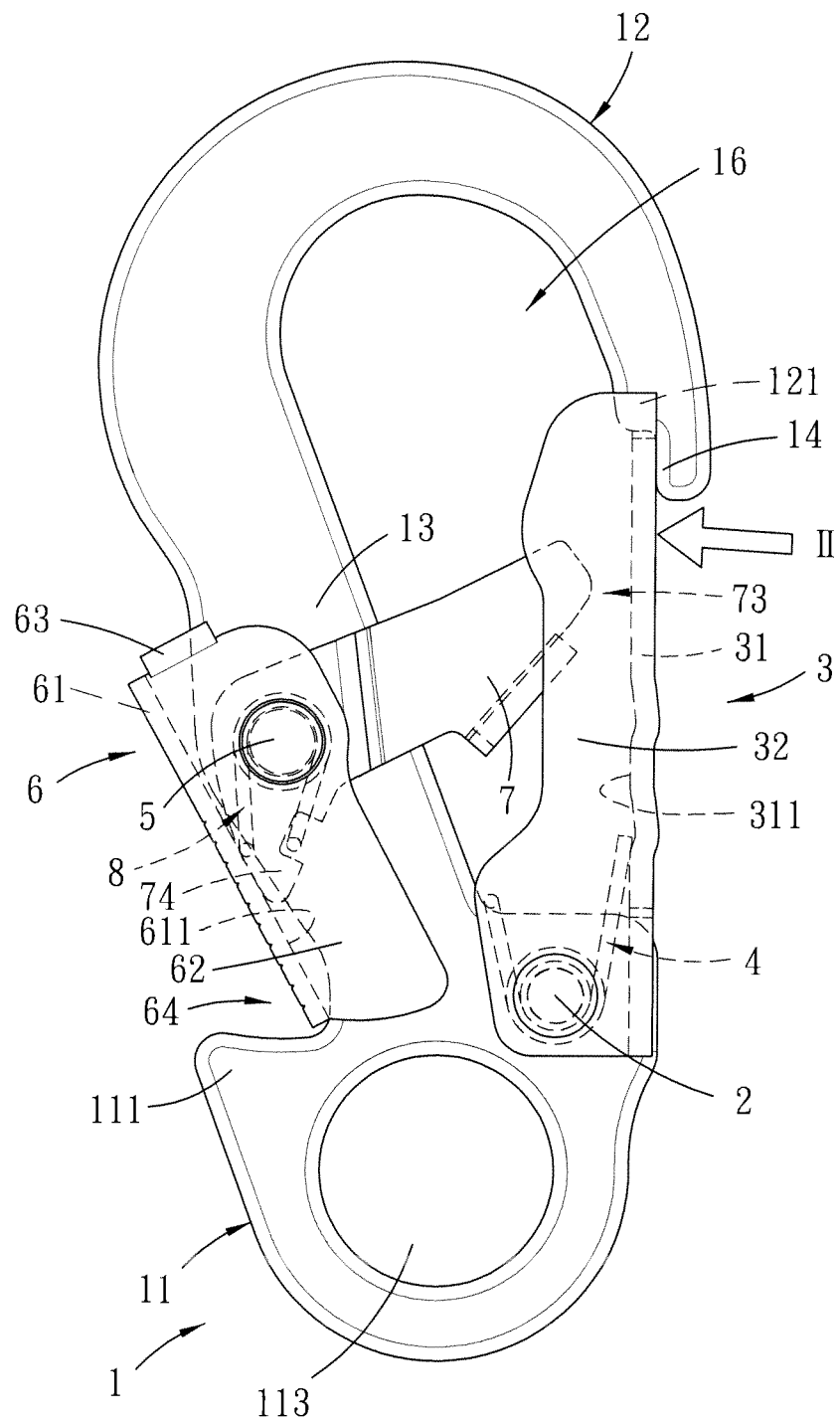

Referring to FIGS. 4 to 6, when a user presses the user-operable portion 64 in a first direction (I), the safety lock unit 7 co-rotates with the operable unit 6 with respect to the intermediate portion 13 from a locked position (as shown in FIG. 4) to an unlocked position (as shown in FIG. 5). In the locked position, the first abutting end portion 73 of the safety lock unit 7 abuts against the inner surface 311 of the latch unit 3 so as to retain the latch unit 3 at the closed position. As shown in FIG. 5, when the user-operable portion 64 is pressed to rotate toward the intermediate portion 13 of the main body 1, the inner surface 611 of the operable unit 6 abuts against and pushes the second abutting end portion 74 of the safety lock unit 7. As a result, the safety lock unit 7 co-rotates with the operable unit 6 with respect to the intermediate portion 13 to the unlocked position, where the first abutting end portion 73 is removed from the inner surface 311 of the latch unit 3. At this time, the user can push the latch unit 3 in a second direction (II) to rotate with respect to the base portion 11 from the closed position (see FIG. 5) to the opened position (see FIG. 6), where the latch unit 3 allows access into the inner space 16 through the opening 15.

Further, during rotation of the latch unit 3 from the closed position to the opened position, the latch unit 3 pushes the safety lock unit 7 so as to make the safety lock unit 7 continuously rotate with respect to the intermediate portion 13 until the plate portion 31 of the latch unit 3 abuts against one surface of the connecting portion 72 of the safety lock unit 7. At this time, the other surface of the connecting portion 72 of the safety lock unit 7 abuts against the intermediate portion 13, and the latch unit 3 is completely opened and the opening 15 is unblocked. Moreover, when the user releases the latch unit 3, the first elastic member 4 and the second elastic member 8 respectively bias the latch unit 3 and the safety lock unit 7 so as to restore the latch unit 3 from the opened position to the closed position, and to restore the safety lock unit 7 to the unlocked position (as shown in FIG. 5). Then, when the user releases the user-operable portion 64 of the operable unit 6, the second elastic member 8 further restores the safety lock unit 7 from the unlocked position to the locked position, and simultaneously, the second abutting end portion 74 of the safety lock unit 7 pushes the operable unit 6 away from the intermediate portion 13 of the main body 1 to the original state as shown in FIG. 3.

To sum up, the latch unit 3 is pivoted to the base portion 11 of the main body 1 by the first pivot member 2, and the operable unit 6 and the safety lock unit 7 are pivoted to the intermediate portion 13 of the main body 1 by the second pivot member 5, such that the latch unit 3 can be pressed to the opened position to allow access into the inner space 16 through the opening 15. By virtue of the first and second elastic members 4, 8, the latch unit 3 can be restored from the opened position to the closed position for blocking the opening 15.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A safety hook comprising:
a main body that includes a base portion, an intermediate portion connected to said base portion, and a hook portion connected to said intermediate portion opposite to said base portion, curvedly extending from said intermediate portion toward said base portion, cooperating with said base portion and said intermediate portion to define an inner space, and cooperating with said base portion to define an opening in spatial communication with said inner space;
a first pivot member that is disposed at said base portion of said main body;
a latch unit that is pivoted to said base portion of said main body by said first pivot member, that is rotatable with respect to said base portion from a closed position, where said latch unit blocks said opening, to an opened position, where said latch unit allows access into said inner space through said opening, and that has an inner surface facing said intermediate portion;
a second pivot member that is disposed at said intermediate portion of said main body;
an operable unit that is pivoted to said intermediate portion of said main body by said second pivot member, and that includes a user-operable portion distant from said second pivot member; and
a safety lock unit that is pivoted to said intermediate portion by said second pivot member, and that includes an abutting end portion capable of abutting against said inner surface of said latch unit;
wherein, when said user-operable portion of said operable unit is pressed, said safety lock unit is co-rotatable with said operable unit with respect to said intermediate portion of said main body from a locked position, where said abutting end portion of said safety lock unit abuts against said inner surface of said latch unit so as to retain said latch unit at the closed position, to an unlocked position, where said abutting end portion of said safety lock unit is removed from said inner surface of said latch unit so as to allow said latch unit to pivot with respect to said base portion of said main body from the closed position to the opened position.

2. The safety hook as claimed in claim 1, wherein said user-operable portion of said operable unit is disposed adjacent to said base portion of said main body, is spaced apart from said intermediate portion of said main body when said safety lock unit is at the locked position, and pivots toward said intermediate portion upon being pressed.

3. The safety hook as claimed in claim 1, wherein said first pivot member is a shaft extending through said base portion of said main body, and said safety hook further comprises an elastic member winding around said first pivot member and biasing said latch unit to be retained at the closed position and to be restored from the opened position to the closed position.

4. The safety hook as claimed in claim 3, wherein said elastic member includes an intermediate segment disposed astride said base portion of said main body, two winding segments respectively and spirally extending from two opposite ends of said intermediate segment in a ring shape and winding around said first pivot member, and two biasing arms extending respectively from said winding segments and biasing and abutting against said inner surface of said latch unit.

5. The safety hook as claimed in claim 1, wherein said hook portion of said main body includes a free end opposite to said intermediate portion and facing said base portion, and said main body further includes a protrusion protruding from said free end of said hook portion; and
wherein said latch unit includes a plate portion having an edge that is distant from said first pivot member and that is formed with a notch, and said notch receives said free end of said hook portion and said protrusion abuts against said plate portion when said latch unit is at the closed position.

6. The safety hook as claimed in claim 1, wherein said second pivot member is a shaft extending through said intermediate portion of said main body, and said safety hook further comprises an elastic member winding around said second pivot member and biasing said safety lock unit to be retained at the locked position.

7. The safety hook as claimed in claim 6, wherein said elastic member includes an intermediate segment disposed astride said intermediate portion of said main body, two winding segments respectively and spirally extending from two opposite ends of said intermediate segment in a ring shape and winding around said second pivot member, and two biasing arms extending respectively from said winding segments and biasing and abutting against said safety lock unit.

8. The safety hook as claimed in claim 7, wherein said safety lock unit includes two wing plates spaced apart from and parallel to each other, and a connecting portion interconnecting said wing plates, each of said wing plates including a positioning portion that is adjacent to said operable unit and that receives and positions a respective one of said biasing arms of said elastic member.

9. The safety hook as claimed in claim 8, wherein said second pivot member extends through said intermediate portion of said main body and said wing plates of said safety lock unit so as to pivot said safety lock unit to said intermediate portion.

10. The safety hook as claimed in claim 1, wherein said latch unit includes a plate portion and two parallel side portions extending from said plate portion toward said intermediate portion of said main body.

11. The safety hook as claimed in claim 10, wherein said first pivot member is a shaft extending through said base portion of said main body and said side portions of said latch unit so as to pivot said latch unit to said base portion.

12. The safety hook as claimed in claim 1, wherein said operable unit includes a middle wall and two parallel side walls extending from said middle wall toward said latch unit.

13. The safety hook as claimed in claim 12, wherein said side walls of said operable unit have respective edges opposite to said user-operable portion, and said operable unit further includes two protruding portions protruding respectively from said edges of said side walls toward each other and receiving said intermediate portion of said main body therebetween.

14. The safety hook as claimed in claim 12, wherein said second pivot member is a shaft extending through said intermediate portion of said main body and said side walls of said operable unit so as to pivot said operable unit to said intermediate portion.

* * * * *